(12) United States Patent
Kirsten

(10) Patent No.: US 6,287,084 B1
(45) Date of Patent: Sep. 11, 2001

(54) COMPRESSOR ASSEMBLY

(75) Inventor: Guenter Kirsten, Crimmitschau (DE)

(73) Assignee: KT Kirsten Technologie-Entwicklung GmbH, Gornsdorf (DE)

( * ) Notice: Subject to any disclaimer, the term of this patent is extended or adjusted under 35 U.S.C. 154(b) by 0 days.

(21) Appl. No.: 09/462,377
(22) PCT Filed: Jul. 7, 1998
(86) PCT No.: PCT/EP98/04207
  § 371 Date: Jan. 7, 2000
  § 102(e) Date: Jan. 7, 2000
(87) PCT Pub. No.: WO99/02863
  PCT Pub. Date: Jan. 21, 1999

(30) Foreign Application Priority Data

Jul. 10, 1997 (DE) ............................... 197 29 498

(51) Int. Cl.$^7$ ................................................. F04B 39/04
(52) U.S. Cl. ............................................................ 417/228
(58) Field of Search .................................. 417/228, 313; 210/743, 177, 181, 96.1, 167, 416.3

(56) References Cited

U.S. PATENT DOCUMENTS

| | | | |
|---|---|---|---|
| 4,064,047 | * 12/1977 | Bernreiter et al. | 210/96 R |
| 5,145,585 | * 9/1992 | Coke | 210/695 |
| 5,230,810 | * 7/1993 | Clark et al. | 210/743 |
| 5,466,367 | * 11/1995 | Coate et al. | 210/96.1 |
| 5,540,836 | * 7/1996 | Coyne | 210/221.2 |
| 5,855,791 | * 1/1999 | Hays et al. | 210/696 |

* cited by examiner

Primary Examiner—Charles G. Freay
Assistant Examiner—W Rodriguez
(74) Attorney, Agent, or Firm—Diller, Ramik & Wight

(57) ABSTRACT

A compressor system with a water-injection cooled compressor (12) in a cooling water circuit comprises a measuring device (30) in the cooling water circuit (20) to determine the conductivity of the cooling water, a water supply source (40) to supply non-desalinated water and desalinated water, and a controlling means (70). The controlling means (70) causes the introduction of desalinated water and of non-desalinated water. The controlling means (70) causes the introduction of desalinated water, when the conductivity exceeds an upper conductivity limit, and the introduction of non-desalinated water, when the conductivity falls below a lower conductivity limit, from the water supply source (40) into the cooling water circuit (20). Thereby, the pH-value and the salinity of the cooling water are controlled such that corrosion by and deposition in the cooling water are reduced.

10 Claims, 1 Drawing Sheet

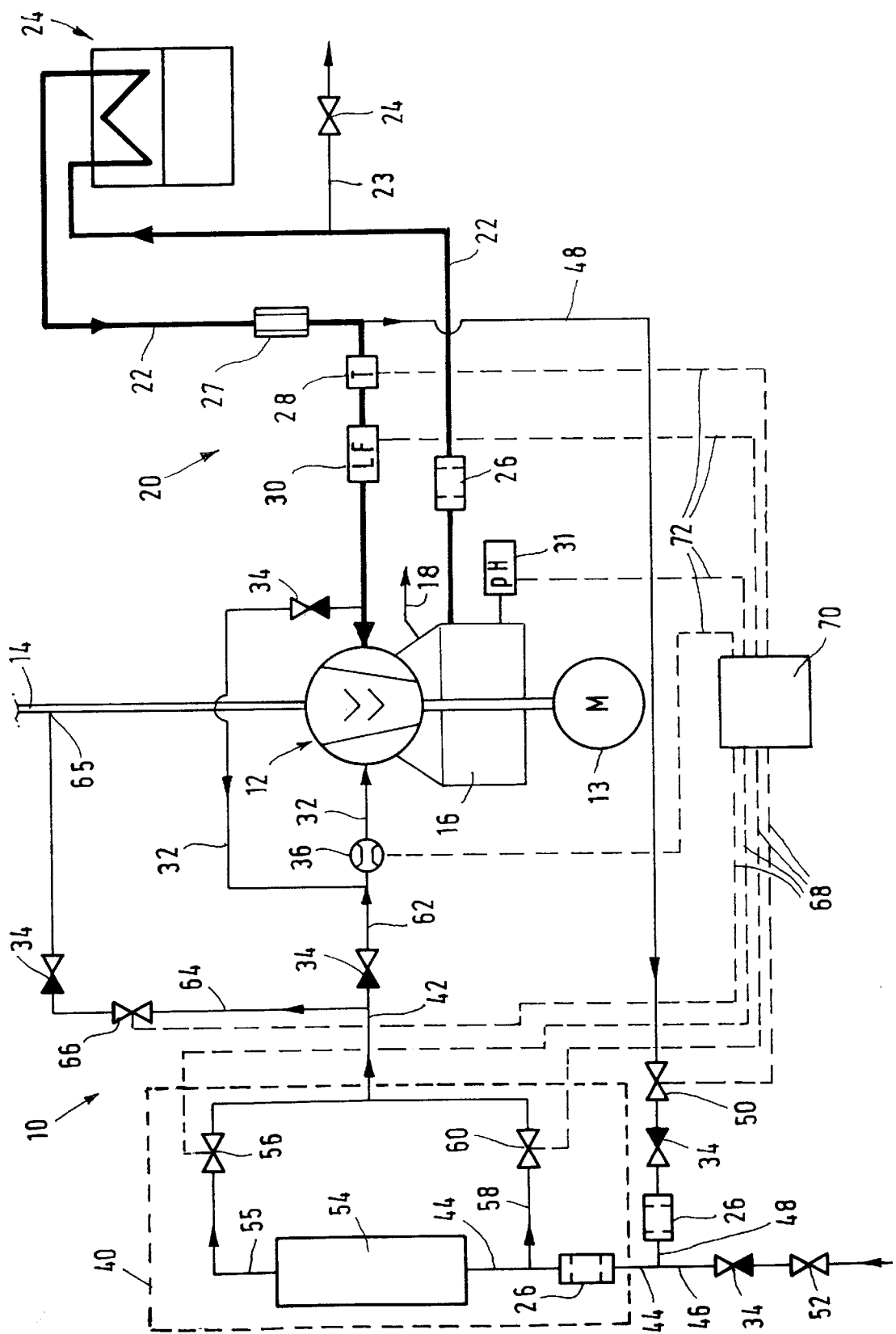

COMPRESSOR ASSEMBLY

BACKGROUND OF THE INVENTION

The present invention refers to a compressor system with a water-injection cooled compressor in a cooling water circuit.

Such compressor assemblies are employed to compress gaseous media, especially air, and to provide this as a pressure gas. Water is used for sealing, lubricating and cooling the compressor, which has the advantage over oil not to be detrimental to health or the environment. DE 44 47 097 describes a water-cooled compressor system in which the compressor is formed as a screw-type compressor. The cooling water is injected in the area of the rotors of the compressor and reseparated from the compressed gas after leaving the compressor. The water heated in the compressor is then guided towards a cooling means. Then the cooled cooling water is filtered and re-supplied to the compressor. In this process, various parameters of the cooling water can be changed by evaporation of the cooling water or by absorption of humidity from the air into the cooling water: if the relative salinity of the water increases because of evaporation of cooling water, an increased amount of deposit precipitates, which might cause damages and defects in the narrow sealing gaps and to the sealing rings. Deposit formation is kept low by a polarization means, which does not, however, prevent the salinity from rising. If, on the other hand, the salinity of the cooling water decreases because of humidity absorbed from the air, the buffer ability of the cooling water to absorb free carbon dioxide is reduced. Yet free carbon dioxide in the cooling water which is not buffered (bound) is very aggressive and corrosive. The Ph-value of the cooling water might also be changed by evaporation of cooling water, absorption of humidity from the air into the cooling water or absorption of copper or iron ions, so that the cooling water has a corrosive effect.

From DE 821 993 and US 722 524, compressors are known that use distilled water for cooling. Distilled water is rather expensive and is very delicate with a view to its pH value.

SUMMARY OF THE INVENTION

It is the object of the invention to improve the water quality in an injection-cooled compressor system.

In a compressor system according to the invention, the cooling water circuit is provided with a measuring device to determine the values of conductivity of the cooling water and a water supply source to supply non-desalinated water and desalinated water, i.e. non-deionized and deionized water. A controlling means causes the introduction of desalinated water, when the conductivity exceeds an upper conductivity limit, and the introduction of non-desalinated water into the cooling water circuit, when the conductivity falls below a lower conductivity limit. Thus, the salinity of the cooling water is controlled such that the conductivity of the cooling water always remains within a predetermined range. As the conductivity also is an approximation for the pH-value of the water, the pH-value of the cooling water can be controlled such that it does not shift into the acid or alkaline range but remains within the neutral range by controlling the conductivity of the water.

When the conductivity falls below the lower conductivity limit, non-desalinated water is added to the cooling water, thereby increasing the conductivity of the cooling water so that the value of conductivity of the cooling water again rises above the lower conductivity limit. By controlling the conductivity of the cooling fluid to be above a lower conductivity limit, a strong decline in the pH-value of the water is avoided. Thereby, the pH-value of the water is maintained above a pH-value of 6.5, for example. Thus, the cooling water is not aggressive, so that the corrosion because of the cooling water within the coolant circuit is greatly reduced.

When the upper conductivity limit is exceeded, desalinated water is added to the cooling water. Thereby, the conductivity of the cooling water is reduced. After the conductivity falls below the upper conductivity limit, the introduction of desalinated water is stopped again. By means of the salts dissolved in the cooling water, the cooling water can absorb carbon dioxide, which is absorbed when air is compressed and has a very corrosive effect. The salinity of the cooling water, however, is not arbitrary, as the salts start to deposit when a certain concentration of salts is exceeded, i.e., particles form in the cooling water, which can lead to damages in sealing gaps, bearing seals, sliding bearings etc. Therefore, the salinity of the cooling water has to be limited, which is determined by the upper conductivity limit.

Thus, two effects are achieved by controlling the conductivity of the cooling water within a determined range of conductivity: firstly, a super-acidity of the cooling water is avoided, thereby in turn avoiding corrosion within the cooling water circuit. Secondly, the salinity of the cooling water is maintained below a limit so that no deposition occurs, whereby damages or defects of movable parts within the cooling circuit can be avoided. Thereby compressor systems can be put into practice in which less corrosion-resistant materials can be used in the cooling water circuit and in the compressor. As the cooling water is nearly free of deposits, a compressor can be designed with very narrow sealing gaps, and therefore, for example, with sliding bearings. Thus, the cooling water control means according to the invention provides the preconditions for increasing the effectivity and longevity of a gas compressor system.

Preferably, the water supply source comprises a desalinization device which is supplied with non-desalinated water. Furthermore, a bypass is provided bypassing the desalinization device, and valves are provided connecting either the desalinization device or the bypass to the compressor. The valves are switched such that water desalinated in the desalinization device is supplied to the compressor or the cooling circuit when the conductivity falls below a lower limit. If non-desalinated water is to be supplied to the cooling circuit, the valves are switched such that the non-desalinated water is guided past the desalinization device through the bypass and supplied to the compressor or the cooling water circuit in a non-desalinated state. The non-desalinated water supplied to the desalinization device or the bypass can, for example, be drinking water from the public drinking water net. Preferably, the desalinization device is provided as an ion exchanger or a reversed osmosis device.

The overall control of the conductivity can occur in the form of a flicker control or continuously. Preferably, the conductivity can be controlled in a range from 10 to 20 $\mu$S/cm at 25° C.

In a preferred embodiment, there is provided a return pipe from the cooling water circuit to a water supply source inlet through which water of the cooling water circuit can be supplied to the water supply source. The cooling water coming from the cooling water circuit can be desalinated in the desalinization device of the water supply source when needed. This results in a closed coolant circuit the cooling water thereof is desalinated in a leg parallel to the compressor in the desalinization device and resupplied to the cooling water circuit. Thus, the cooling water is recycled. Only little strain is put on the desalinization device by not desalinating water supplied from the outside, e.g. drinking water, as the water of the cooling water circuit generally only has to be desalinated to a relatively small extent.

In a preferred embodiment of the invention, the water of the water supply source is led into a gas take-in duct of the compressor. Thus, water coming from the water supply source is not led into the cooling water circuit, which approximately provides the pressure of the gas compressed by the compressor, but is led into the gas take-in duct of the compressor where there is an approximately atmospheric pressure. In this manner, an introduction of the water of the water supply source into the cooling water circuit can be achieved without a compression thereof.

In a preferred embodiment, the compressor comprises sliding bearings, the water of the water supply source being injected directly into the sliding bearings. The injection of water into the sliding bearings is performed before the compressor starts working. Thus it is ensured that the sliding bearings are filled with water, i.e. are lubricated, when the compressor starts working. An abrasion-intensive mixed friction involving dry friction and sliding friction when the compressor starts working can thereby be avoided. After the compressor starts working, the pressure in the cooling circuit increases to the compressor pressure. That is why the water coming from the water supply source, which only has a slight excess pressure, cannot be led directly into the cooling water circuit any more. Therefore, the water coming from the water supply source is led into the gas take-in duct after the compressor starts working.

In a preferred embodiment, the cooling water circuit provides a temperature sensor to compensate for the temperature when measuring the conductivity. As the conductivity of water strongly depends on the temperature, a temperature compensation of the measured conductivity is required for a normalized measurement. Therefore, the temperature sensor is arranged near the position of the conductivity sensor.

Preferably, the water supply source is connected to the drinking water net. Thereby, non-desalinated water to be supplied to the water supply source is available at any place of installation, by means of which water the salinity and therefore the conductivity of the cooling water can be increased. The system water pressure of the drinking water net is sufficient to supply the water to the water supply source and to inject it, in a non-desalinated or desalinated state, into the gas take-in duct or, before the compressor starts working, into the compressor.

An embodiment of the invention will now be described in detail with reference to the drawing.

BRIEF DESCRIPTION OF THE DRAWINGS

The FIGURE is an illustration of a compressor system 10 for generating oil-free pressure air.

DESCRIPTION OF THE PREFERRED EMBODIMENT

The compressor system 10 includes a compressor 12 driven by an electric motor 13 and provided as a water-injection cooled screw-type compressor. The screw-type compressor 12 draws in air via a gas take-in duct 14 and compresses it to approximately 8 to 10 bars. The air compressed in the compressor 12 is led into a precipitation or settling vessel 16 from which it can be taken out via a pressure air conduit 18 for further use.

The compressor system 10 comprises a cooling water circuit 20 in which the cooling water cooling the compressor 12 is cooled and purified. During compression, the cooling water is injected in the area of the rotors of the screw-type compressor via water injection nozzles to seal the sealing gap in the compressor 12 and to absorb and dissipate the heat produced during compression in the compressor 12.

The cooling water is reseparated from the pressure air in the settling vessel 16 and led to a cooling means 24 via a cooling water conduit 22. In the course of the cooling water conduit 22 between the settling vessel 16 and the cooling means 24, a particulate filter 26 is arranged in which impurities and fine particles are filtered out of the cooling water. The cooling water flows on to the cooling means 24 in which the cooling water heated in the screw-type compressor 12 is cooled again. After that, the cooled cooling water passes through a polarization means 27 in which the voltage occurring between two electrodes transforms the natural minerals dissolved in the cooling water into the corresponding hydroxides, thereby avoiding precipitations and incrustations. In the further course of the cooling water conduit 22, there are arranged a temperature sensor 28 and a conductivity sensor 30. The cooling water passing the conductivity sensor 30 flows on through the cooling water conduit 22 to the compressor 12, in which it is injected via nozzles in the area of the rotors of the screw-type compressor 12 on the one hand, and via a bearing conduit 32 into sliding bearings of the screw-type compressor 12 on the other hand. In the course of the bearing conduit 32, a reflux valve 34 and a current relay 36 are arranged.

Cooling water can be drained from the cooling water conduit 22 via a drain pipe 23 with a drain valve 24, when too much cooling water circulates in the cooling water circuit 20.

A pH-value sensor 31 is provided on the settling vessel 16 measuring the pH-value of the cooling water in the settling vessel 16.

The compression system 10 further comprises a water supply source 40 wherefrom recycled water can be supplied to the cooling water when required. The water supply source 40 serves to provide desalinated and non-desalinated water which is introduced into the coolant circuit 20 via an outlet 42 of the water supply source 40.

Water from a conduit 46 connected to the drinking water net or cooling water from a branch conduit 48 is optionally fed to the water supply source 40 via a supply conduit 44. The branch conduit 48 branches between the polarization means 27 and the temperature sensor 28 from the cooling water conduit 22 so that a part of the cooling water can be deviated via the branch conduit 48 bypassing the compressor 12 to the water supply source 40. A control valve 50, a reflux valve 34 with a passage towards the water supply source as well as a particulate filter are arranged in the course of the branch conduit 48. The drinking water conduit 46 comprises a stop valve 52 and also a reflux valve 34 continuous towards the direction of the water supply source 40.

The drinking water conduit 46 and the cooling water branch conduit 48 discharge into the supply conduit 44 in the course of which a further particulate filter 35 is arranged. The supply conduit 44 finally discharges into a desalinization device 54, which can be formed as a mixed bed ion exchanger. The desalinization device 54 can also be formed as a reversed osmosis device. In the mixed bed ion exchanger 54, strongly acid and strongly alkaline exchangers are employed which withdraw almost all the cations and anions from the water to be treated. The water thus deionized, i.e. desalinated, has a conductivity of about 0.1 $\mu$S/cm to 0.2 $\mu$S/cm at 25° C. Thus, the supplied non-deionized water is deionized by the desalinization device 54, i.e. desalinated to more than 90%. Therefore, the deionized water exiting from an output conduit 55 of the desalinization device 54 has a low salinity and therefore a low conductivity as well as a low pH-value.

A control valve 56 is arranged in the course of the desalinization output conduit 55, by means of which the output conduit 55 may be opened or closed.

A bypass 58 is provided parallel to the desalinization device 54, which bypass connects the supply conduit 44 of the water supply source 40 to the output conduit 42 of the water supply source 40, bypassing the desalinization device 54. In the course of the bypass 58, there also is arranged a control valve 60. The water flowing towards the water supply source 40 through the drinking water supply conduit 44 or the cooling water branch conduit 48 can be led either through the desalinization device 54 or past the desalinization device 54 directly to the output conduit 42 according to the position of the valves 56,60.

The output conduit 42 in turn branches into two branch conduits: firstly, the output conduit 42 is connected to the bearing conduit 32 of the cooling circuit 20 via a connection conduit 62 and discharges upstream of the current relay 36 into the bearing conduit 32. In the connection conduit 62, there is also provided a reflux valve 34 the direction of passage thereof has been chosen to be the direction towards the bearing conduit 32. Secondly, an inlet conduit 64 leads from the output conduit 42 of the water supply source 40 to a water inlet 65 in the air take-in duct 14. In the course of the inlet conduit 64, there also is provided a reflux valve 34 as well as a control valve 66.

A pH-sensor 31 can be used to measure the pH-value in the settling vessel 16. However, the results obtained by measuring the pH-value are not always reliable and can therefore not be used as the primary control variable.

The membrane filters 26 prevent an unchecked development of germs in the cooling system and in the desalinization device 54.

All four control valves 50,56,60,66 are controllable, i.e. switchable, by a controlling means 70 via electric control lines 68. The four sensors 26,28,30,36 of the compressor system 10 are connected to the controlling means 70 via measuring lines 72, so that the measuring data of the sensors 26,28,30,36 are received and inputted by the controlling means 70.

During the operation of the compressor 12, the cooling water circulating in the cooling water circuit 20 is subject to a lot of influences which keep changing the composition and the properties of the cooling water. Chemical, electrochemical as well as physical processes are responsible for this. Thereby, especially the pH-value as well as the salinity of the cooling water are changed. For example, in the summer months and especially in tropical regions, a lot of the humidity in the air taken in precipitates as a condensate, which gets into the cooling water circuit in the compressor 12 and in the settling vessel 16. Thereby, the cooling water might be diluted with respect to its salinity, so that the relative salinity of the cooling water is reduced. However, when very dry cold air is compressed, evaporated water can be withdrawn from the cooling water and be absorbed and dissipated by the compressed heated air. Thereby, the relative salinity of the water is increased. A salinity which is too high leads to a deposition, i.e. a precipitation of deposits in the cooling water. The deposits can cause damages or defects to sealing gaps, seals, valves etc. of the compressor 12. If the salinity is too low, the buffer ability of the cooling water with respect to the absorption of carbon dioxide contained in the air taken in is reduced. If the buffer ability of the cooling water is low, not enough carbon dioxide can be absorbed from the compressed air. The free carbon dioxide not buffered in the cooling water in turn lowers the pH-value, i.e., the cooling water acquires aggressive, corrosive properties.

A cooling water which is as neutral as possible what the corrosion is concerned should have a pH-value of about 7. In no case, however, should the pH-value be outside of the range between 6.5 and 7.5, as corrosion can occur even at these values.

Generally, the salinity of water is determined by measuring the conductivity of the water. In the present example, the conductivity of the cooling water should always be between 10 and 20 $\mu$S/cm (at 25° C.). The conductivity is measured by the conductivity sensor 30 and received, evaluated and converted into corresponding control measures and instructions by the controlling means 70.

The value of conductivity measured by the conductivity sensor 30 is compensated, i.e. normalized, in the controlling means 17 according to the temperature measured by the temperature sensor 28. This is necessary as the conductivity of the water depends highly on the temperature.

If the upper conductivity limit of 20 $\mu$S/cm is exceeded, the controlling means 70 opens the control valve 56 in the output conduit 55 of the desalinization device 54. Thereby, non-desalinated water can flow through the supply conduit 44 and the desalinization device 54 and be desalinated. The desalinated, i.e. deionized water flows via the water supply source output conduit 42 and the inlet conduit 64 to the water inlet 65 where the desalinated water is introduced into the air take-in duct 14. The desalinated water thus introduced gets into the compressor 12 together with the air taken in and is finally reseparated from the compressed air in the settling vessel 16. By this route, it gets back into the cooling water circuit 20, where it changes the salinity. This way, desalinated water is introduced into the cooling water circuit 20 until the conductivity measured by the conductivity sensor falls back again below the upper conductivity limit of 20 $\mu$S/cm.

If the value falls below the lower conductivity limit of 10 $\mu$S/cm, the non-desalinated water from the drinking water conduit 46 is not led via the desalinization device 54 but via the bypass 58 directly to the output conduit 42 by opening the control valve 60. The non-desalinated water is then also introduced into the gas take-in duct 14 via the inlet conduit 64.

If the value falls below the lower conductivity limit of the water supply source 40 and desalinated water has to be available, either the drinking water from the conduit 46 or the cooling water led through the branch conduit 48 can be desalinated. If the upper conductivity limit is exceeded, i.e., if the salinity in the cooling water increases in an undesired manner, in the case of a normal operation, the cooling water introduced via the branch conduit 48 of the water supply source 40 is desalinated. In this process, little strain is put on the desalinization device 54, and the periods for its regeneration are prolonged. The inlet of water to the water supply source 40 is controlled by correspondingly controlling the control valves 50,52 of the drinking water conduit 46 and the branch conduit 48.

The pH-value sensor 31 continuously measures the pH-value of the cooling water in the settling vessel 16. If the pH-value falls below 6.5, the water supply source 40 supplies non-desalinated water to the cooling water circuit, until the pH-value exceeds 6.5 again. However, if the pH-value exceeds 7.5, water desalinated in the desalinization device 54 is supplied to the cooling water circuit 20. The pH-value is, however, always only corrected to such an extent as to maintain the preset conductivity of the cooling water. This means that maintaining the preset conductivity has priority over controlling the pH-value.

Before the compressor 12 starts working, i.e., before the rotors start rotating, the sliding bearings of the compressor 12 have to be filled with water in order to avoid an abrasion-intensive mixed friction when the compressor starts working. However, the sliding bearings cannot be filled with water from the cooling water circuit 20, as the cooling water circuit 20 is not yet pressurized.

In order to fill the sliding bearings of the compressor 12 before the compressor 12 starts working, the drinking water supplied by the drinking water conduit 46 is used, which water generally has a pressure of about 3.5 bars. The drinking water is prepared in the water supply source 40 in a known manner such that it has a conductivity in the range from 10 to 20 µS/cm approximately. It is only after the sliding bearings of the compressor 12 have been filled with water in this manner that the rotors of the compressor 12 can start working.

As the working pressure of 8 to 10 bars quickly sets within the compressor, the prepared water from the drinking water net cannot be fed to the sliding bearings after the compressor has started working, as the pressure thereof of 3.5 bars is too low for this purpose. Therefore, after the compressor 12 has started working, the sliding bearings are lubricated by the cooling water fed to the sliding bearings of the compressor 12 via the bearing conduit 32. This is possible as the cooling water always provides a pressure of approximately the working pressure of the compressor 12.

As sliding bearings are very sensitive to a failure of the water lubrication, the flow towards the sliding bearings via the bearing conduit 32 is supervised by the current relay 36. As soon as the current relay 36 indicates that the flow of the water is too small, the controlling means 70 switches off the motor 13, so that the rotors of the compressor 12 come to a standstill.

If within a preset timeframe no sufficient change in conductivity occurs when the upper conductivity limit of 20 µS/cm is exceeded and desalinated water is added, it can be presumed that the capacity of the desalinization device 54 is exhausted. In this case, the controlling means 70 indicates the exhaustion of the desalinization device 40 via a display device (not shown) and, if necessary, switches off the motor 13 of the compressor 12.

By controlling the salinity of the cooling water via measuring the conductivity, as has been described, a compressor system is provided fulfilling high demands on the quality of the cooling water irrespective of climatic conditions, the quality of the drinking water, the place of installation etc. Thereby, compressors with very narrow sealing gaps can be put into practice. Furthermore, a corrosion of the compressor system is avoided by indirectly controlling the pH-value of the cooling water. Therefore, less noble and less expensive materials can be used while increasing the service life of the system at the same time.

Although a preferred embodiment of the invention has been specifically illustrated and described herein, it is to be understood that minor variations may be made in the apparatus without departing from the spirit and scope of the invention, as defined the appended claims.

What is claimed is:

1. A compressor system comprising a water-injection cooled compressor (12) in a cooling water circuit (20), characterized by
    a measuring device (30) in the cooling water circuit (20) to determine the conductivity of the cooling water,
    a water supply source (40) to supply non-desalinated water and desalinated water, and
    a controlling means (70) which causes the introduction of desalinated water, when the conductivity exceeds an upper conductivity limit, and the introduction of non-desalinated water, when the conductivity falls below a lower conductivity limit, from the water supply source (40) into the cooling water circuit (20).

2. The compressor system of claim 1, characterized in that the water supply source (40) comprises a desalinization device (54) fed with non-desalinated water and a bypass (58) to bypass the desalinization device (54), valves (56,60) being provided either connecting the desalinization device (54) or the bypass (58) to the compressor.

3. The compressor system of claim 1, characterized in that a branch conduit (48) from the cooling water circuit (20) is provided to an inlet (44) of the water supply source (40), water from the cooling water circuit (20) being able to be supplied to the water supply source (40) via the branch conduit (48).

4. The compressor system of claim 1, characterized in that an inlet conduit (64) leading from the water supply source (40) into the take-in duct (14) of the compressor (12) is provided.

5. The compressor system of claim 1, characterized in that the desalinization device (54) is provided as an ion exchanger or as a reversed osmosis device.

6. The compressor system of claim 1, characterized in that the compressor (12) comprises sliding bearings and the water of the water supply source (40) is connected directly to the sliding bearings via a connection conduit (62).

7. The compressor system of claim 4, characterized in that a controlling means (70) is provided, which causes water from the water supply source (40) to be injected into the bearing of the compressor (12) before the compressor starts working, and to be introduced into the take-in duct (14) after the compressor has started working.

8. The compressor system of claim 1, characterized in that a temperature sensor (28) is provided in the cooling water circuit (20) to compensate for the temperature when measuring the conductivity.

9. The compressor system of claim 1, characterized in that the water supply source (40) is connected to the drinking water net.

10. The compressor system of claim 1, characterized in that a pH-value measuring device (31) connected to the controlling means (70) for measuring the pH-value of the cooling water is provided, the controlling means (70) controlling the water supply source (40) such that the pH-value of the cooling water remains at approximately 7.0.

* * * * *